Oct. 3, 1944.  C. G. KRONMILLER  2,359,482
THERMOSTAT
Filed May 15, 1942
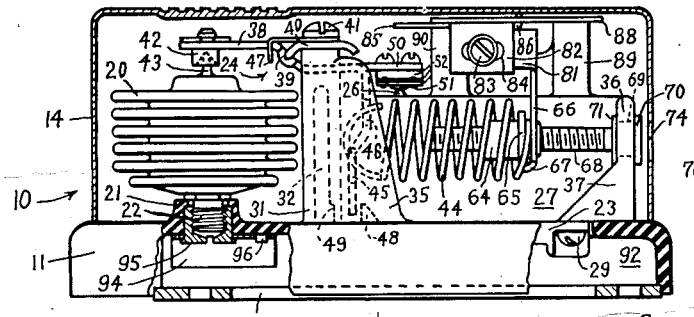
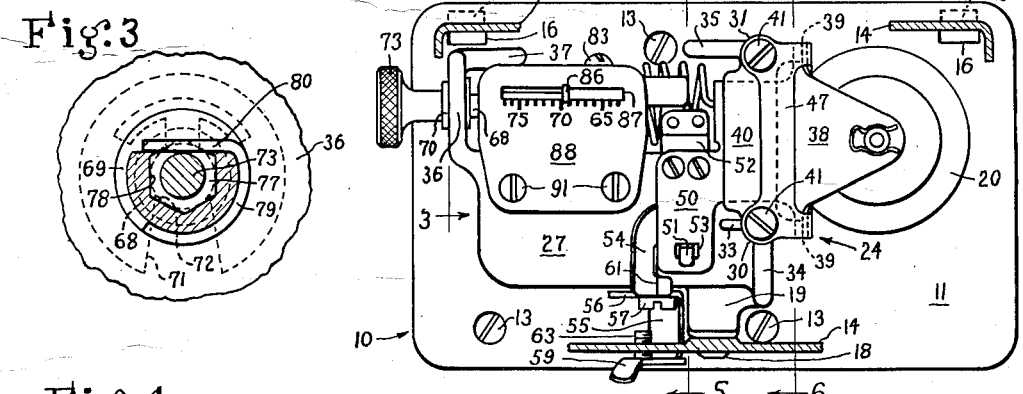
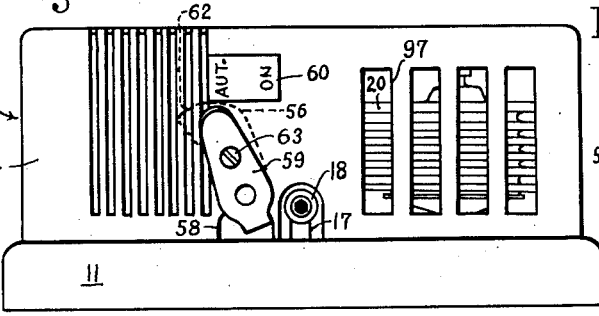
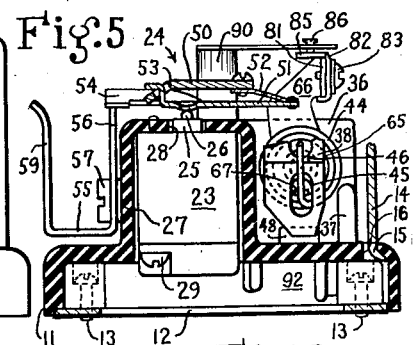
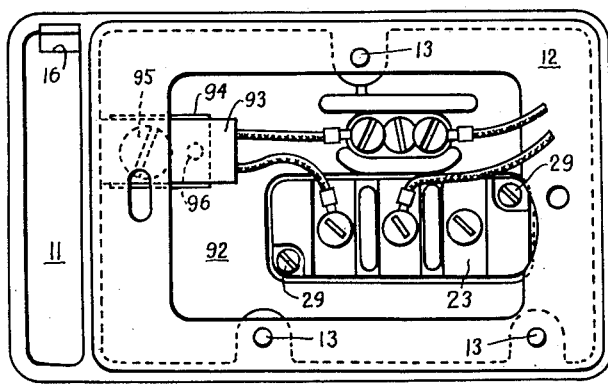
INVENTOR.
Carl G. Kronmiller
BY George H. Fisher
ATTORNEY Patented Oct. 3, 1944

2,359,482

UNITED STATES PATENT OFFICE 2,359,482

THERMOSTAT

Carl G. Kronmiller, Minneapolis, Minn., assignor to Minneapolis-Honeywell Regulator Company, Minneapolis, Minn., a corporation of Delaware Application May 15, 1942, Serial No. 443,099

13 Claims. (Cl. 200—122)

This invention relates generally to thermostats but more particularly to improvements therein providing greater sensitivity of the thermally responsive element, novel construction, combination, and arrangement of parts facilitating economies in the construction, assembly, and calibration of the instrument, and generally providing additional utility in thermostats not heretofore known in the art.

The primary function of a theromstat is to control the temperature of a space or chamber in which it is located. This function is usually effected through the agency of an electrical switch means actuatable by the thermally responsive element. It is a well known fact that the heat generated by the flow of current through the switch means affects the sensitivity of the element and creates a spurious response thereof which is false to the actual ambient temperature of the space or chamber. This undesirable result is especially present when the circuits controlled by the switch means necessitates the flow of comparatively heavy currents therethrough since the amount of heat generated by the switch means varies directly with the square of the current.

An important object of this invention is to obviate the spurious effect of the switch means on the thermally responsive element and thereby increase the sensitivity thereof by providing means for thermally insulating the element from the switch means.

Another object of this invention is to provide a base for supporting the thermally responsive element and switch means which is formed in such a manner as to thermally insulate the element from the switch means.

A further object is to utilize the base as formed in accordance with this invention as a means for operably supporting the operative connections between the thermally responsive element and the switch means.

A still further object of this invention is to provide a thermostat which may be mounted on an outlet box, the thermostat having a thermally nonconductive base for supporting a thermally responsive element and a switch means actuatable thereby, the base being formed in such a manner as to thermally insulate the element from the switch means, and the switch means being open to the outlet box whereby the heat generated by the switch means is dissipated in the outlet box.

Another object of this invention in which a self-return switch such as disclosed in the co-pending application of Albert E. Baak, Serial No. 307,991, filed December 7, 1939, now U. S. Patent 2,318,734, is utilized, is to provide a novel manually operable means for preventing an actuation of the switch.

A further object of this invention is to provide a novel and expeditious means for securing a factory calibration of the thermostat.

A still further object is to provide a novel means for securing a detachable adjusting knob to the thermostat.

Still another object of this invention is to provide a novel method of mounting a thermally responsive element with respect to an auxiliary heater associated therewith, the heater being secured to the element in such a manner as to provide a thermally conductive connection between them, and the connection also serving to secure said element to its supporting base.

Still other objects are those not specifically referred to hereinabove which will become apparent with a reading of the annexed specification, reference being had to the accompanying drawing, in which:

Figure 1 is a side view of a thermostat embodying the features of my invention, certain parts being broken away to better illustrate the construction, Figure 2 is a front view of the thermostat, the cover therefor being removed except for fragmentary portions which illustrate the manner in which the cover is secured to the thermostat, Figure 3 is an enlarged fragmentary section along the lines 3—3 of Figure 2, Figure 4 is another side view of the thermostat opposite to that shown in Figure 1, Figure 5 is a sectional view of the thermostat taken substantially along the lines 5—5 of Figure 2, Figure 6 is a fragmentary view of the base of the thermostat as seen when viewed along the lines 6—6 of Figure 2, and Figure 7 is a rear view of the thermostat.

Referring now to the drawing, the numeral 10 generally designates a thermostat which is shown in Figure 2 as it appears when mounted on a vertical wall. As in the usual case, the thermostat is mounted on an outlet box, not shown, the base 11 of the thermostat being secured to an outlet box cover 12 which in turn is secured to the outlet box in the usual manner. The thermostat is provided with a cover 14 which has tips 15 shaped as seen in Figure 2, to form a hinge connection with apertures 16 in the base 11. The cover 14 is provided with an indentation 17 on its underside which permits the cover to swing about its hinge connection down over a screw 18 by means of which the cover is securely fastened to the base, the screw being carried by a projection 19 on the base.

Thermostat 10 includes a condition responsive element 20 of the bellows type which contains a suitable volatile fluid. The bellows 20 is supported on the base 11 and has a threaded stud 21 secured thereto which extends into an apertured projection 22 on the base. The bellows 20 actuates a control mechanism 23 of the self-return type through operative connections generally designated by the numeral 24. Although this invention is applicable to any mechanism of this type, for the convenience of illustration, a snap action switch such as described in the copending application of Albert E. Baak, Serial No. 307,991, filed December 7, 1939, now U. S. Patent 2,318,734, has been shown. The snap action mechanism 23 is completely enclosed in a casing having a shoulder 25 through which an operating pin 26 extends. The switch 23, as used in this invention, produces a disconnection of the circuits controlled by the switch when the operating pin 26 is depressed and connects the circuits when the operating pin 26 is free to extend from the switch. The operating pin 26 is formed of thermally nonconductive material such as Bakelite, for reasons hereinafter to be pointed out.

The base 11 is formed of suitable thermally nonconductive material such as Bakelite and is shaped in such a manner as to thermally insulate the bellows 20 from the switch 23 and to serve, as well, as a support for the other parts of the thermostat. To this end, the base 11 is provided with a hollow projection 27 which projects forwardly of the base as viewed in Figure 2. The switch 23 is mounted in the projection 27, and secured therein by suitable screws 29, the shoulder 25 extending through an aperture 28 in the projection. With this arrangement, it is obvious that the switch 23 is completely thermally insulated from the bellows 20 and the heat generated by the switch naturally dissipates into the outlet box.

One end of projection 27 is provided with a pair of posts 30 and 31 which are interconnected by a web 32. The post 30 is additionally supported by a gusset 33 which rises from the projection 27 and a gusset 34 which rises from both of the projections 19 and 27. The post 31 is additionally supported by a gusset 35 which rises from the base 11. The other end of projection 27 is provided with a lateral web 36 which is additionally supported by a gusset 37 which rises from the base 11.

The operative connections 24 comprise a bell-crank lever 38 which is fulcrumed on knife edges 39 carried by a plate 40 which is supported on the posts 30, 31 and secured thereto by suitable screws 41. One end of the bell-crank lever carries a seat 42 which receives a pin 43 secured to the bellows 20. The other end of the bell-crank lever 38 is connected to a tension spring 44, the end of the spring being received in apertures 45, 46 of the bell-crank lever 38 as best seen in Figure 5. It will be seen that the tension in the spring 44 is along the axis thereof which is at right angles to the force of expansion of the bellows 20. The resultant of these forces, accordingly, is at a diagonal to the axis of the bellows 20 and the axis of the spring 44 and urges the bell-crank lever 38 against the knife edges 39. The plate 40, accordingly, is bent at an angle to substantially coincide with the direction of the resultant force. In order to prevent an accidental removal of the bell-crank lever 38 from the knife edges 39, a guard plate 47 is mounted on the plate 40 and secured thereto by the screws 41. The pivotal movement of the lever 38 about the knife edges 39 is limited by a projection 48 from the base 11 and a projection 49 from the web 32. The edge of the plate 40 opposite the knife edges 39 is bent downward somewhat to serve as an additional stop preventing extreme counter-clockwise movement of the lever 38.

The bell-crank lever 38 has a lateral portion 50 which carries an actuating blade 51 which engages the operating pin 26 of the switch 23, as best seen in Figure 5. One end of the blade 51 is connected to the lever portion 50 by a spring blade 52. The other end of the blade 51 makes a loose connection with the lever portion 50 being bent to a particular angular configuration as seen in Figure 5, and extended through an aperture 53 provided in the lever portion 50. The spring rate of spring blade 52 is such that a force due to the expansion of the bellows 20 is transmitted through the lever 38, spring blade 52 and blade 51 to depress the operating pin 26 of the switch 23 without causing movement of the blade 51 with respect to the lever portion 50. However, the blade 51 may be moved with respect to the lever portion 50 to permit the operating pin 26 to return to its extended position, in which position the switch 23 is actuated to close the circuits controlled thereby without causing movement of the lever 38 or setting up a strain therein.

The above arrangement of the lever portion 50 and the blade 51 is utilized to provide a manually operable means for actuating the switch 23 and taking it out of control of the bellows 20. The blade 51 has an extension 54 which engages the cam shaped arm 56 of a U-shaped lever 55 pivotally supported on the projection 27 by a pivot screw 57. The bight portion of the U-shaped lever 55 extends through an indentation 58 in the under side of the cover 14, and the other arm 59 of the U-shaped lever extends along the side of the cover adjacent to a legend bearing plate 60. When the arm 59 is in the "automatic" position as shown in Fig. 4, the blade 51 is free to move up and down without the extension 54 engaging the cam arm 56. Under this arrangement, the bellows 20 is in full control of the switch 23. When the arm 59 is moved to the "on" position, the cam surface of the arm 56 raises the blade 51, the extension 54 being bent upward along the line 61 (see Figure 2) to facilitate the cam action. Clockwise movement of the arm 56 is limited by the engagement of the arm with the projection 19. In this position, the flattened surface 62 of the arm 56 has moved beyond a vertical line through the pivot 57 and a toggle action results which securely holds the arm 56 in the "on" position. It will be noted that because of the connections between the lever portion 50 and blade 51, it is impossible for the lever portion 50 to actuate the operating pin 26 without moving the blade 51, which movement is impossible when the extension 54 is engaged by the arm 56. In this respect the manually operable switch serves as an additional stop to take up any strains created by any expansive forces developed by the bellows 20. To prevent an accidental movement of the arm 59 out of the "automatic" position, a screw 63 may be used which extends through the arm 59 into the cover 14. While the particular arrangement for providing an "on" condition of the switch 23 has been shown, it is obvious that by arranging the arm 56 to engage the top of the extension 54 clockwise movement of the manually operable lever might be caused to produce an "off" condition of the switch 23.

The other end of the spring 44 is secured to a shouldered collar 64, the end of the spring being clamped between the shoulder 65 of the collar 64 and a carrier member 66 staked to the collar 64. Relative movement between the member 66 and the collar 64 is prevented by a tip 67 on the member 66 which engages a slot in the shoulder 65 as best seen in Fig. 5. The collar 64 receives a shouldered screw 68, the shoulder 69 of said screw is mounted for rotation in the lateral web 36 of the projection 27. The screw 68 is prevented from moving axially to the left of the web 36 by the head 70 of the screw 68 and is prevented from moving in the opposite direction by a split washer 71 which fits into an annular groove 72 provided in the screw 68 as best seen in Figure 3.

The screw 68 is rotated by means of a detachable knob 73 which extends through an aperture 74 in the cover 14 to make a snap connection with the shoulder 69 of the screw 68. The knob 73 is provided with a hexagonal projection 75, the tip 76 of the projection being tapered and the projection being provided with an annular groove 77. The screw 68 is provided with a corresponding hexagonal recess 78 to receive the hexagonal projection 75 of the knob 73. The shoulder 69 is recessed transversely to accommodate a snap ring 79 of the particular annular configuration as shown in Figure 3. The arrangement is such that the flat portion 80 of the snap ring 79 projects into the hexagonal recess 78. Thus, when the knob 73 is attached to the screw 68 the tapered edge 76 of the projection 75 first forces the flat portion 80 of the ring radially until the annular groove 77 on the projection aligns itself therewith whereupon the ring snaps into the groove. It is obvious that I have provided a simple and effective means for securing a detachable knob to the adjusting member of a thermostat since the non-circular connection between the parts provides an ideal torque transmitting arrangement. Furthermore, the snap ring connection for preventing relative axial movement of the parts is extremely simple since it obviates the need for screws or like fastening means. The use of a detachable knob is desirable where the thermostats are used in schools or other public places where the instrument is likely to be tampered with. The use of a detachable knob is further desirable in that a fixed knob would necessitate an arcuate slot for permitting swinging movement of the cover 14 which would present the thermostat with an unsightly appearance especially since the knob 73 is located on a side of the thermostat which is in full view when mounted as shown in Figure 2. It will be noted that the indentations 58 and 17 are both on the under side of the thermostat cover 14 and accordingly are in a position where they are not readily seen.

The carrier member 66 is provided with a bent portion 81 which slidably carries an angular member 82 which is formed around it, as best seen in Figure 5. The member 82 is secured to the portion 81 by a screw 83 which extends through a slot 84 in the member 82. The horizontal portion 85 of the angular member 82 is provided with an upturned tip 86 which extends through a slot 87 in an indicia bearing plate 88. The plate 88 is mounted on posts 89 and 90 extended upwardly from the projection 27 and is secured thereto by suitable screws 91. The tip 86 serves as an index which cooperates with the indicia on plate 88 to indicate any one of a plurality of operating points of the thermostat 10 which may be obtained by an adjustment of the operating knob 73.

The relative movement between the index carrying member 82 and the carrier member 66 presents a simple means for providing a factory calibration of the instrument. During such a calibration the instrument is placed in a temperature of known value and the knob 73 is adjusted until the tension in the spring 44 balances the force of the bellows 20. The balance is obtained when the lever 38 has depressed the operating pin 26. The member 82 is then adjusted with respect to the carrier member 66 until the index 86 points to the temperature value indicated on plate 88 which corresponds to the known value of the temperature to which the instrument is subjected.

The base 11 is dish-shaped to provide a chamber 92 between the base and the outlet box cover 12. If it is desired to use an auxiliary heater for the bellows 20 for purposes of anticipating the arrival of the heat in the chamber controlled by the thermostat 10, it may be mounted in the chamber 92. The numeral 93 indicates a heater of the cartridge or shell type which is frictionally held in a U-shaped metal clamp 94. The clamp is secured to the base 11 by a shoulder screw 95 which extends into the aperture projection 22 to threadedly engage the stud 21 secured to the bellows 20. A tip 96 projected from the base 11 through the clamp 94 prevents the clamp from rotating while it is being secured to the stud 21. By this arrangement, it is obvious that the heat generated by the heater 93 is effectively conducted to the bellows 20 through the metallic connection thus provided, and that the heat of the heater reaches the bellows 20 only by conduction through the connection since the thermal non-conductivity of the base 11 prevents heat from reaching the bellows by any other means. Consequently, any heat developed by the heater 93 has a definite effect upon the bellows 20 and its sensitivity for heat anticipation purposes is thereby greatly enhanced. It is also to be noted that the connection between the bellows 20 and the clamp 94 provides a simple and effective means for securing the bellows to the base 11. As seen in Figure 7, the heater 93 is connected in series with the switch 23 as in the usual case.

In the foregoing, it has been pointed out how the base 11 has been formed to thermally insulate the bellows 20 from the switch 23. It is to be further noted that since the operating pin 26 is formed of thermally insulative material that heat from the switch 23 is also prevented from reaching the bellows 20 by conduction through the operative connections 24 therebetween. It has also been seen how the projection 27 on the base 11 has been utilized as a means for supporting the various operating parts of the thermostat thereby obviating the use of separate brackets and the like for such purposes. Consequently, use of the base 11 obviously reduces the number of parts required in the production of the thermostat, thereby promoting economy in the construction and assembly thereof. It is to be further noted that the arrangement of the various parts of the thermostat 10 is such that the bellows 20 exclusively occupies the space behind the windows 97 formed in the cover 14, as may be clearly seen in Figure 4. Accordingly, the bellows 20 is in a position to be accurately responsive to variations in the ambient temperature of the space or chamber in which the thermostat 10 is located since the windows 97 in the cover 14 afford ample circulation of air therethrough.

From the foregoing it is now apparent that I have provided a thermostat which is fully capable of satisfying the objects of the invention set forth hereinabove. Moreover, it is obvious that I have provided many novel features in a thermostat which increase the sensitivity thereof, promote economy in the construction, assembly, and calibration of the instrument, and which generally enhance its utility.

While I have illustrated but one embodiment of my invention, I contemplate all such further embodiments as would naturally occur to those skilled in the art without departing from the spirit of this invention as defined by the appended claims.

I claim as my invention:

1. In a thermostat, a thermally nonconductive base, a hollow projection extended forwardly thereof, an electrical switch means insertable into said projection from the rear of said base, a thermally nonconductive actuating member for said switch means, said member extending through said hollow projection, a thermally responsive element mounted on the base, operative connections between said member and said element, and means for operatively supporting said connections on said projection, said projection and said member serving to thermally insulate said element from said switch means whereby said element responds thermally independently of the heat generated by said switch means.

2. A thermostat comprising, a base, a hollow projection extended forwardly thereof, a switch means mounted in the hollow projection, a thermally responsive element supported on the base for actuating said switch means, operative connections between said element and said switch means, means for operatively supporting said connections on said projection, and spring means interconnected with said connections and said projection for balancing the responsive force of said element at a thermal control point providing an actuated condition of said switch means.

3. A thermostat comprising, a base, a hollow projection extended forwardly thereof, a switch means mounted in the hollow projection, a thermally responsive element supported on the base for actuating said switch means, operative connections between said element and said switch means, means for operatively supporting said connections on said projection, spring means interconnected with said connections and said projection for balancing the responsive force of said element at a thermal control point providing an actuated condition of said switch means, and means for adjusting said spring means to vary the control point of the thermostat.

4. A thermostat comprising, a base, a hollow projection extended forwardly thereof, a switch means mounted in the hollow projection, a thermally responsive element supported on the base for actuating said switch means, operative connections between said element and said switch means, means for operatively supporting said connections on said projection, spring means interconnected with said connections and said projection for balancing the responsive force of said element at a thermal control point providing an actuated condition of said switch means, means for adjusting said spring means to vary the control point of the thermostat, an indicia bearing member supported on said projection for indicating a plurality of control points, and index means carried by said spring means and movable therewith upon adjustment thereof, said index means and said indicia bearing member cooperating to indicate a particular adjusted control point of the thermostat.

5. A thermostat comprising, a base, a hollow projection extended forwardly thereof, a switch means mounted in the hollow projection, a thermally responsive element supported on the base for actuating said switch means, operative connections between said element and said switch means, means for operatively supporting said connections on said projection, spring means interconnected with said connections and said projection for balancing the responsive force of said element at a thermal control point providing an actuated condition of said switch means, means for adjusting said spring means to vary the control point of the thermostat, an indicia bearing member supported on said projection for indicating a plurality of control points, a carrier member supported on said spring means and movable therewith upon adjustment thereof, and index means carried by said carrier member for cooperation with said indicia bearing member to indicate a particular adjusted control point of the thermostat, said index means being adjustable relative to said carrier member whereby said spring means may be adjusted to balance said element when the thermostat is subjected to a thermal condition of known value, and said index means may be adjusted relative to said carrier member so that said index means and said indicia bearing plate cooperatively indicate the known thermal value.

6. In a thermostat, a base having a hollow projection with a hole therein extended forwardly thereof, a switch means mounted in the hollow projection from the back of the base, an actuating member for the switch means extended through the hole in the projection and adapted for movement normally of the base, a thermally responsive bellows supported on the base for actuating said switch means, the axis of said bellows extending normally of the base, operative connections between said bellows and said member, means for operatively supporting said connections on said projection whereby expansion of said bellows depresses said member to actuate said switch means, and spring means interconnected with said connections and said projection for balancing the expansive force of said bellows at a thermal control point providing an actuated condition of said switch means.

7. In a thermostat, a base having a hollow projection with a hole therein extended forwardly thereof, a switch means mounted in the hollow projection from the back of the base, an actuating member for the switch means extended through the hole in the projection, a thermally responsive bellows supported on the base for actuating said switch means, operative connections between said bellows and said member, said connections comprising a lever engageable with said bellows and fulcrumed upon said projection, an actuating blade engageable with said actuating member, and a spring blade for interconnecting said lever and actuating blade whereby the force of expansion of said bellows is transmitted through said connections to actuate said switch means but said actuating blade is movable relative to said lever, and stop means for limiting the movement of said lever.

8. In a thermostat, a base, a hollow projection extended forwardly thereof, a switch means mounted in the hollow projection, an actuating member for the switch means extended through the projection, a thermally responsive bellows supported on the base for actuating said switch means, operative connections between said bellows and said member, said connections comprising a lever engageable with said bellows and fulcrumed upon said projection, an actuating blade engageable with said actuating member, a spring blade for interconnecting said lever and actuating blade whereby the force of expansion of said bellows is transmitted through said connections to actuate said switch means but said actuating blade is movable relative to said lever to prevent an actuation of said switch means, and manually operable means for moving said actuating blade relative to said lever.

9. A thermostat comprising a thermally responsive element, a self-return switch means actuable thereby, operative connections between said element and said switch means, said connections comprising a first member engageable with said element, a second member engageable with said switch means, and a resilient blade for interconnecting said members whereby the responsive force of said element is transmitted through said connections to actuate said switch means, but said second member is movable relative to said first member by a force in addition to that of the switch means to prevent an actuation of said switch means, and manually operable means for moving said second member relative to said first member.

10. In a thermostat, a base, a bellows supported on the base, the axis of the bellows extending normally of the base, an auxiliary heater for the bellows disposed on the opposite side of the base, a clamp for the heater, and means for securing the clamp to the bellows comprising a threaded stud secured to the bellows and extended into an aperture formed in the base, and a shouldered nut extended through an aperture in said clamp and into said aperture in said base into threaded engagement with said stud.

11. In a space thermostat, a base, a bellows supported on the base in heat transfer relation with the medium in said space, an auxiliary heater for the bellows disposed on the opposite side of the base, means for metallically connecting said heater to said bellows whereby the heat of said heater is conducted through said metallic connection, said connection also serving to secure said bellows to said base.

12. In a space thermostat, a thermally nonconductive base, a bellows supported on the base in heat transfer relation to the atmosphere, an auxiliary heater for the bellows disposed on the opposite side of the base, and means for metallically connecting the heater to the bellows whereby the response of said bellows effected by the heater is caused only by conduction of heat through said metallic connection.

13. In a space thermostat, in combination, a base of heat insulating material formed to provide a forwardly extending closed portion which is hollow as viewed from the back, said closed portion extending beyond the plane of the base, a switch mounted in said hollow portion from the back of said base whereby said switch does not project beyond the back of said base, a temperature responsive element mounted on the front of said base in heat transfer relation to said space whereby the insulating material of said base is interposed between said switch and thermally responsive element, said switch and temperature responsive element thereby being in substantially the same plane, and operative connections between said switch and temperature responsive element.

CARL G. KRONMILLER.